United States Patent [19]
Curtis

[11] 3,930,539
[45] Jan. 6, 1976

[54] METHOD OF OBTAINING INCREASED PRODUCTION IN WELLS

[76] Inventor: Arvel C. Curtis, 10318 Rosser Road, Dallas, Tex. 75221

[22] Filed: May 8, 1975

[21] Appl. No.: 575,826

[52] U.S. Cl. ............... 166/300; 166/302; 166/307; 166/308; 166/312
[51] Int. Cl.² .................... E21B 43/26; E21B 43/27
[58] Field of Search .......... 166/300, 307, 299, 271, 166/312, 308, 302, 304

[56] References Cited
UNITED STATES PATENTS

| | | | |
|---|---|---|---|
| 139,010 | 5/1873 | Looney | 166/300 |
| 1,806,499 | 5/1931 | Ranney et al. | 166/307 X |
| 2,747,672 | 5/1956 | Simm | 166/300 |
| 3,529,666 | 9/1970 | Crowe | 166/300 |
| 3,593,793 | 7/1971 | Kelseaux | 166/300 X |
| 3,630,281 | 12/1971 | Fast et al. | 166/299 X |
| 3,702,635 | 11/1972 | Farr | 166/300 X |
| 3,776,312 | 12/1973 | Ban et al. | 166/302 |
| R26,466 | 9/1968 | Closmann | 166/271 |

*Primary Examiner*—Stephen J. Novosad
*Assistant Examiner*—George A. Suckfield

[57] ABSTRACT

In order to increase the productivity of oil and gas wells, hydrochloric acid and phosphoric acid are pumped into the well. Thereafter, aqueous ammonia is forced into the bottom of the well by nitrogen under pressure. This produces a violent exothermic reaction in the formation around the bottom of the well which emulsifies the paraffin and disintegrates the limestone, so as to open the formation by forming large passages and cavities over large areas and distances, permitting the oil or gas to flow freely through the formation to the well bore.

3 Claims, 1 Drawing Figure

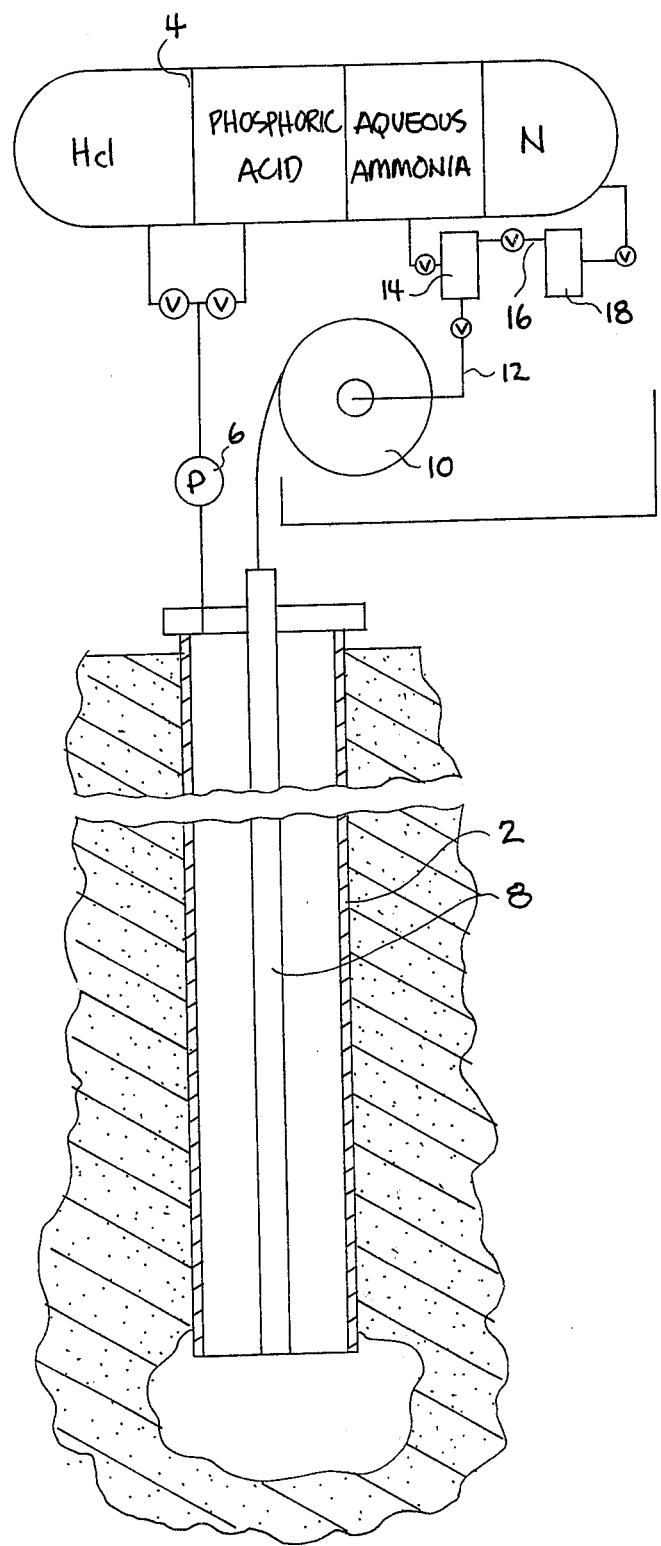

METHOD OF OBTAINING INCREASED PRODUCTION IN WELLS

BACKGROUND OF THE INVENTION

Field of the Invention

Various methods have been used to obtain increased production in oil and gas fields, particularly in connection with older wells. These have included the introduction of water or oil under pressure, and the use of acids. All of them however are relatively expensive, and it is often uneconomical to treat a well because of the increase in production is not sufficient to pay for the treatment.

SUMMARY OF THE INVENTION

According to the present invention, a substantial increase in the productivity of oil and gas wells is produced by introducing a mixture of strong acids which do not react vigorously with each other under normal conditions, into the formation at the bottom of the well, and thereafter introducing into the bottom of the well an accelerator which with the two acids enters into a strong exothermic reaction, producing heat of the order of 300°F and creating passages and cavities of considerable size in the formation, while at the same time paraffin which may be present is emulsified. The preferred acids are hydrochloric acid and phosphoric acid, and the accelerator is aqueous ammonia which is pumped in under substantial pressure by nitrogen under pressure.

BRIEF DESCRIPTION OF THE DRAWING

The drawing shows diagrammatically an arrangement for carrying out the invention.

DESCRIPTION OF THE PREFERRED EMBODIMENTS

The drawing shows an oil well which may for instance be an existing casing 2, or may be a pipe which is entered into an existing hole. From a suitable source of supply, such as a tank truck 4, hydrochloric and phosphoric acids are pumped out by a pump 6 into the top of the casing 2 and flow down either admixed or successively by gravity to the bottom of the well. A flexible steel pipe 8 is introduced into the well extending to the bottom of the casing 2. This pipe is fed from a reel 10, to the hub of which a pipe 12 supplies aqueous ammonia from a tank 14. The top of the tank 14 is connected by a line 16 to a tank 18 into which liquid nitrogen flows. The nitrogen thus entering the top of the tank 14 forces the aqueous ammonia down through the pipe 8 to the bottom of the well.

When the aqueous ammonia comes in contact with the mixture of hydrochloric and phosphoric acids, a violent exothermic reaction occurs, raising the temperature to as much as 300°F. The ammonia is pumped in in a quantity at least substantially sufficient to neutralize the two acids. By the time that this is done, the formation will have been freed to a considerable degree of paraffin which has gone into emulsion and the limestone will have been eroded to produce large cavities and passages extending for a substantial distance away from the well.

If it is desired to open up a still larger area, the same procedure may be repeated a number of times.

As an example, in a 6,000 foot well with a 6 inch casing, there are introduced 1,000 gal. of about 30% concentration hydrochloric acid, 1,000 gal. of about 30% concentration commercial phosphoric acid and 1,000 gal. of about 30% concentration aqueous ammonia at a pressure of 1,000 psi. Higher or lower pressures, for example between 300 and 2,000 psi, can be used.

The two acids are preferably used in substantially equal proportions, but the proportions may vary considerably, for example between 25 and 75% of each. The ammonia is used in substantially the same quantities as one of the acids, but ordinarily enough is pumped in to neutralize or expend the acids.

I claim:

1. A process of treating oil or gas wells to increase the productivity thereof which comprises introducing into the bottom of the well a mixture of two acids which alone do not react vigorously with each other at normal temperatures and pressures and pumping into the bottom of the well an accelerator which produces in conjunction with the mixture of acids a violent exothermic reaction, thereby producing an expansion force and disintegrating the formation to form large cavities and passages therein.

2. A process as claimed in claim 1, in which the acids are hydrochloric and phosphoric acids and the accelerator is aqueous ammonia.

3. A process as claimed in claim 2, in which the accelerator is forced into the well by nitrogen under pressure.

* * * * *